L. GOODHART.
DRIVING GEAR FOR VEHICLES.
APPLICATION FILED JAN. 15, 1918.
1,268,960.
Patented June 11, 1918.
2 SHEETS—SHEET 1.
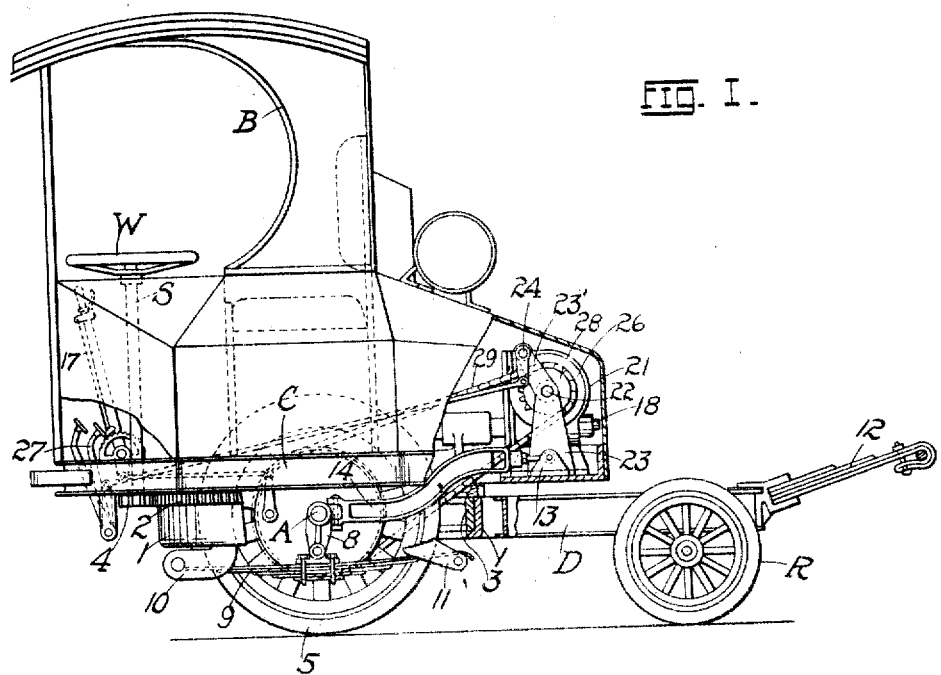
FIG. I.
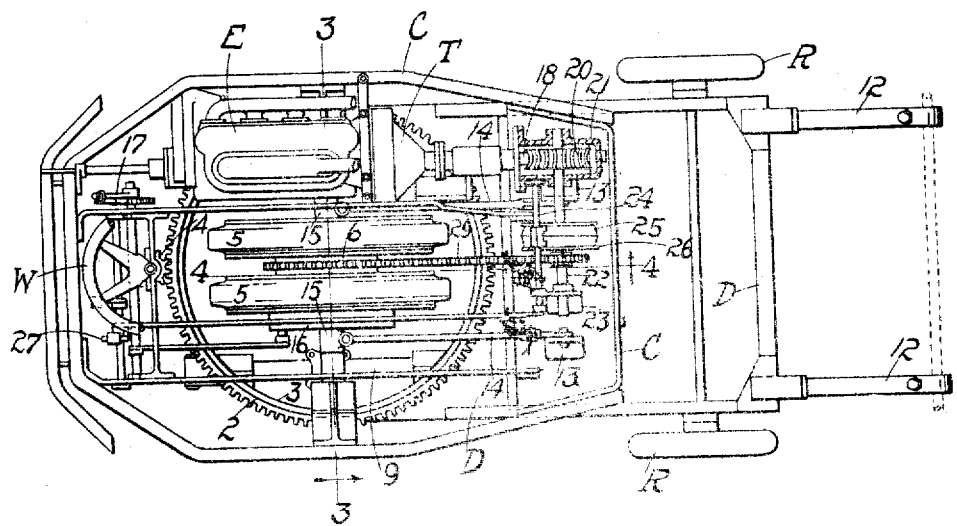
FIG. 2.
WITNESSES:
Harry A. Beiner
Elu M. Siegel
INVENTOR
Louis Goodhart
BY Emil Starek
ATTORNEY.

L. GOODHART.
DRIVING GEAR FOR VEHICLES.
APPLICATION FILED JAN. 15, 1918.
1,268,960.
Patented June 11, 1918.
2 SHEETS—SHEET 2.
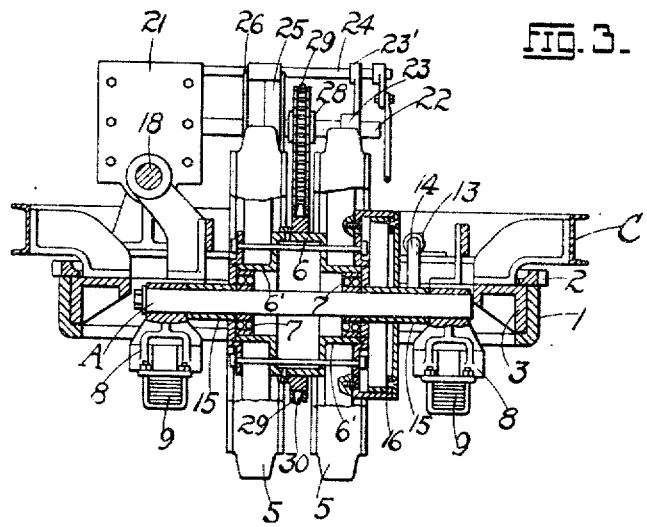
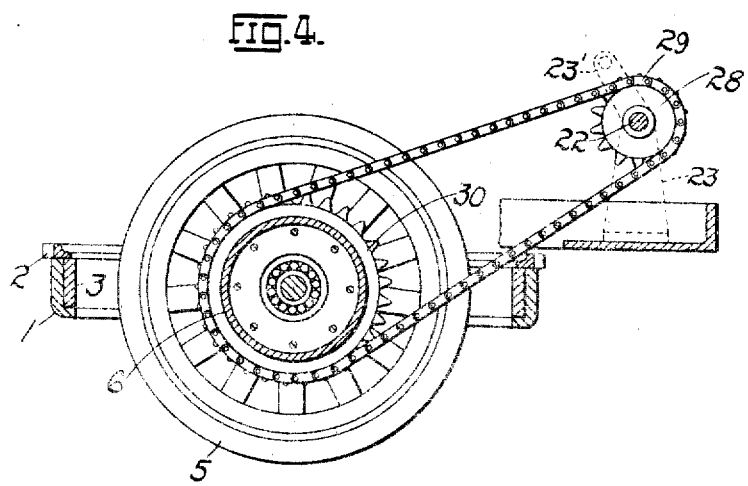
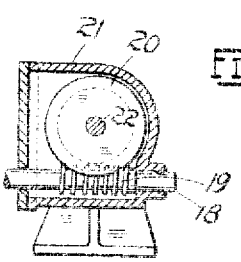
WITNESSES:
Harry A. Bennett
Else W. Siegel
INVENTOR.
Louis Goodhart.
By Emil Storek
ATTORNEY.

UNITED STATES PATENT OFFICE.

LOUIS GOODHART, OF ST. LOUIS, MISSOURI, ASSIGNOR TO ONE WHEEL TRUCK COMPANY, OF ST. LOUIS, MISSOURI, A CORPORATION OF MISSOURI.

DRIVING-GEAR FOR VEHICLES.

1,268,960.　　　　　　Specification of Letters Patent.　　Patented June 11, 1918.

Application filed January 15, 1918. Serial No. 211,933.

*To all whom it may concern:*

Be it known that I, LOUIS GOODHART, a citizen of the United States, residing at St. Louis, State of Missouri, have invented certain new and useful Improvements in Driving-Gear for Vehicles, of which the following is a full, clear, and exact description, reference being had to the accompanying drawings, forming a part hereof.

The present improvement is directed in particular to driving gear for tractors and other self-propelled vehicles having a single driving or traction wheel in connection with a rotatable carriage by which the vehicle is steered. The object of the invention is to provide a simple drive and one reduced to the minimum number of parts which can be disposed conveniently and to the best advantage in a tractor having the carriage and driving wheel above referred to. A further object is to provide a drive which will cause an even distribution of the stresses through the axle and the traction wheel supported thereby; a drive whose component parts are readily accessible; and one possessing further and other advantages better apparent from the following detailed description in connection with the accompanying drawings in which—

Figure 1 represents a side elevation of a tractor having my invention applied thereto; Fig. 2 is a top plan thereof; Fig. 3 is a vertical cross-section on the line 3—3 of Fig. 2; Fig. 4 is an enlarged vertical longitudinal section on the line 4—4 of Fig. 2; and Fig. 5 is a vertical longitudinal sectional detail of the housing for the worm drive, the worm pinion and worm wheel being in side elevation.

Referring to the drawings, D represents the draft-frame of the tractor the same terminating at the forward end in a ring 1 surmounted by a gear-ring 2, the draft-ring 1 having mounted rotatably therein the carriage ring 3 secured to, or forming part of the carriage frame, C which supports the engine E, the cab B, the steering staff S, the steering wheel W and all the appurtenances which go to form a complete driving and steering mechanism for the carriage or member to which the draft-frame is attached. The lower end of the steering rod (not shown) terminates in a pinion 4 meshing with the gear-ring 2, whereby when rotation is imparted to the steering wheel W the pinion is caused to travel circumferentially on the toothed periphery of the gear-ring thus imparting a horizontal rotation to the carriage, and steering the vehicle. Disposed centrally within the carriage-ring 3 is a driving and steering-wheel comprising two wheel sections 5, 5, secured in any mechanical manner to a central drum 6, the said drum being provided with hub terminals 6' over which the wheel sections 5 are passed, said hub terminals likewise providing suitable raceways for the ball (or roller) bearings 7 which directly support the wheel axle A from the ends of which are suspended the links 8 to which are in turn secured the carriage supporting springs 9, the latter being preferably connected to the carriage by the spring pads 10 and 11 bolted or otherwise secured to the carriage ring. The rear end of the draft-frame is provided with straps 12 for coupling the tractor to any independent vehicle or trailer as understood in the art. In the present example the tractor in addition to the front driving and steering wheel is provided with rear running wheels R, R, as shown. The carriage frame is provided with brackets 13, 13, from which lead tension or torque rods 14, 14, the front ends of the rods being secured to the sleeves 15 passed over the axle A. To one side of the driving wheel (preferably to the left-hand wheel section looking toward the front of the vehicle) is secured an emergency brake-drum 16 the brake mechanism of which is controlled from the emergency brake lever 17 through any set of well known connections not necessary to either detail or describe.

With the exception of the driving wheel, the parts above described and others shown but not referred to, are well known and no claim thereto is made herein. T, represents the transmission case, the transmission shaft 18 in the present embodiment of my invention terminating at the rear end in a worm pinion 19 which meshes with a worm wheel 20 mounted to rotate in a vertical plane, a suitable housing 21 being provided for these parts. The worm wheel 20 is carried by a countershaft 22 which is supported by a bracket 23 and by the walls of the housing 21, the bracket 23 being provided with an extension arm 23' for the support of one end of a parallel rock-shaft 24 the opposite end of which is supported by the housing 21. The said rock-shaft operates the service brake 25 of the brake-drum 26 carried by the counter-shaft 22, the rock-shaft being itself actuated from the brake pedal 27 through any set of intermediate connections as shown but not necessary to describe because well understood in the art. Secured to the countershaft 22, and disposed in the vertical plane of the longitudinal axis of the vehicle, and in alinement with the center of the drum 6, coupling together the wheel sections 5, 5, is a sprocket wheel, or pinion 28 from which leads a sprocket chain 29, said chain passing over the teeth of a band 30 carried by or secured to the periphery of the drum 6, the chain traveling in a vertical plane parallel to the axis of the transmission shaft 18 and between the two wheel sections 5, 5, as shown. The lower portion of the sprocket chain 29 moreover passes through the opening of the carriage ring 3, intersecting, or cutting across the horizontal plane of rotation of said ring, or across the horizontal plane of rotation of the carriage frame C to which said ring is secured and of which it may be considered a part. The disposition of the drive-chain is such as to clear the walls of the carriage-ring and its appurtenances, leaving the chain accessible for taking up the slack or shortening the same or for purposes of repair. The driving mechanism in the present embodiment of my invention may be said to comprise a power transmission or drive shaft (18) on one side of the driving wheel disposed parallel to the rotation plane of said wheel, a countershaft (22) disposed in the rear of the driving wheel at right angles to the rotation plane thereof, and a sprocket drive chain (29) disposed between the wheel sections and operating in a plane parallel to the axis of the drive-shaft. This plane under the arrangement described is substantially the central plane of rotation of the driving wheel, that is to say, the central plane between the wheel sections 5, 5, between which the chain operates. In the present construction too, the rotation axis of the driving wheel is disposed substantially in the plane of rotation of the carriage ring 3. I may of course depart from the details here shown without in any wise affecting the nature or spirit of the invention. Features shown but not alluded to are well known and require no description in the present connection.

Having described my invention what I claim is—

1. In a tractor, a draft frame, a carriage coupled rotatably to said frame and provided with a horizontally disposed ring, a traction wheel comprising two wheel sections spaced apart, and a drum connecting said sections disposed centrally within the carriage ring, the axis of rotation of the wheel being disposed substantially in the plane of rotation of the carriage ring, a drive shaft on the carriage disposed parallel to the rotation plane of the traction wheel, a countershaft leading from the drive shaft and disposed at right angles thereto, and a drive chain or belt disposed in the plane of rotation of the traction wheel, leading from the counter shaft to the drum between the sections of said wheel, the drive belt having portions thereof extending into the carriage ring and intersecting the rotation plane thereof.

2. In a tractor, a rotatable carriage frame provided with a horizontally rotatable ring, a centrally located traction wheel in said ring comprising two wheel sections spaced apart, a central drum connecting said wheel sections, a drive-shaft on the carriage frame on one side of the traction wheel disposed parallel to said wheel, a counter shaft leading from the drive-shaft, and a sprocket chain-drive leading from the counter shaft to the drum of the traction wheel, said chain extending into the carriage ring at an angle to the plane of rotation of the ring, and being disposed on the central longitudinal axis of the carriage frame.

3. In a tractor, a suitable draft-member, a carriage provided with a ring mounted for horizontal rotation relatively to the draft member, a driving wheel in the center of said ring comprising two wheel sections, a spacing member or drum joining said sections, an axle for said wheel, means for securing the carriage to the axle, a drive-shaft on the carriage disposed on one side of the driving wheel and parallel thereto, a countershaft actuated by the drive-shaft and disposed at right angles thereto, and a final driving member leading from the counter-shaft between the wheel sections into the carriage ring and intersecting the plane of rotation of said ring, the said driving member being disposed parallel to the drive-shaft and substantially in the plane of the longitudinal axis of the vehicle.

In testimony whereof I affix my signature, in presence of two witnesses.

LOUIS GOODHART.

Witnesses:
 EMIL STAREK,
 ELSE M. SIEGEL.